Patented Aug. 1, 1950

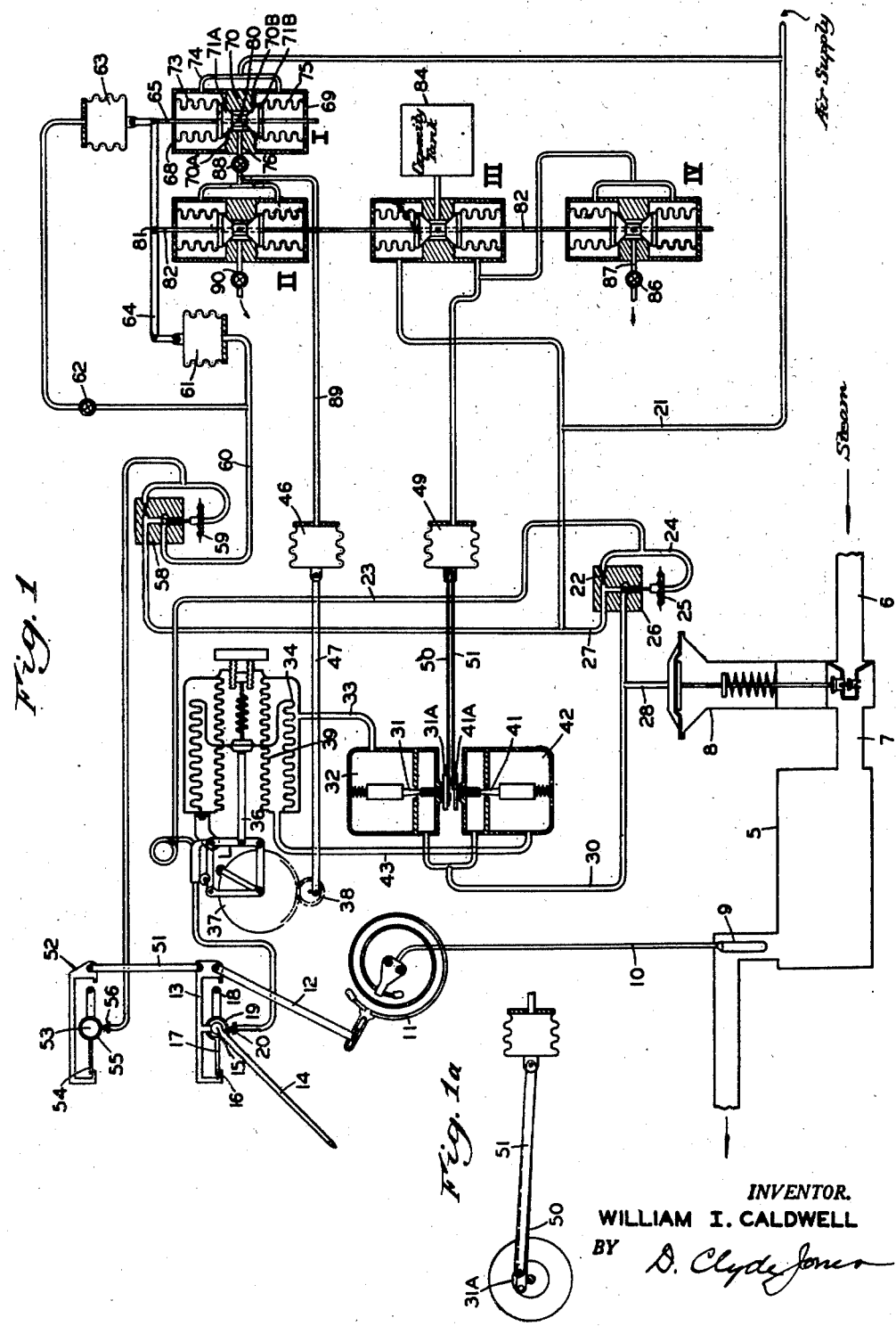

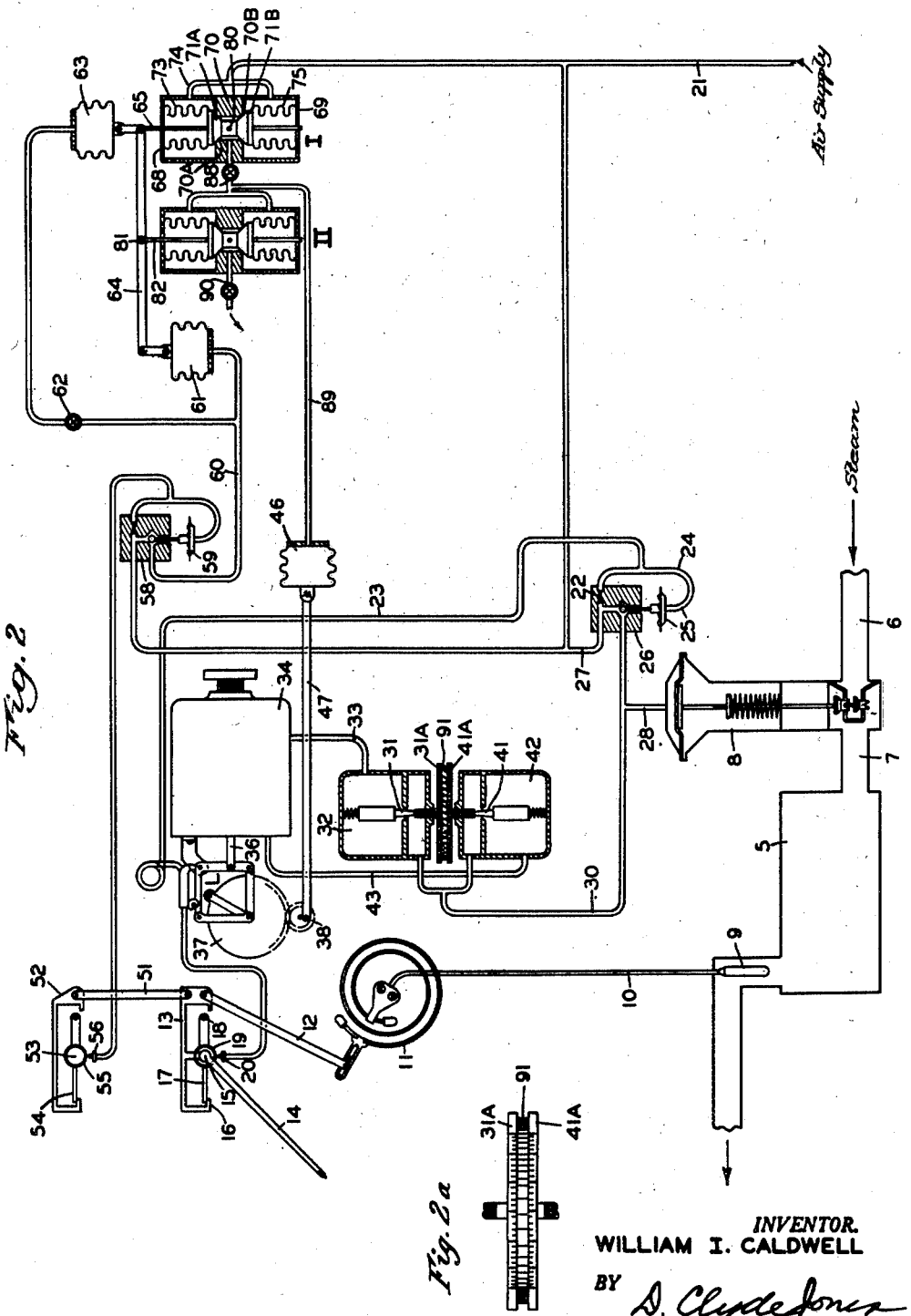

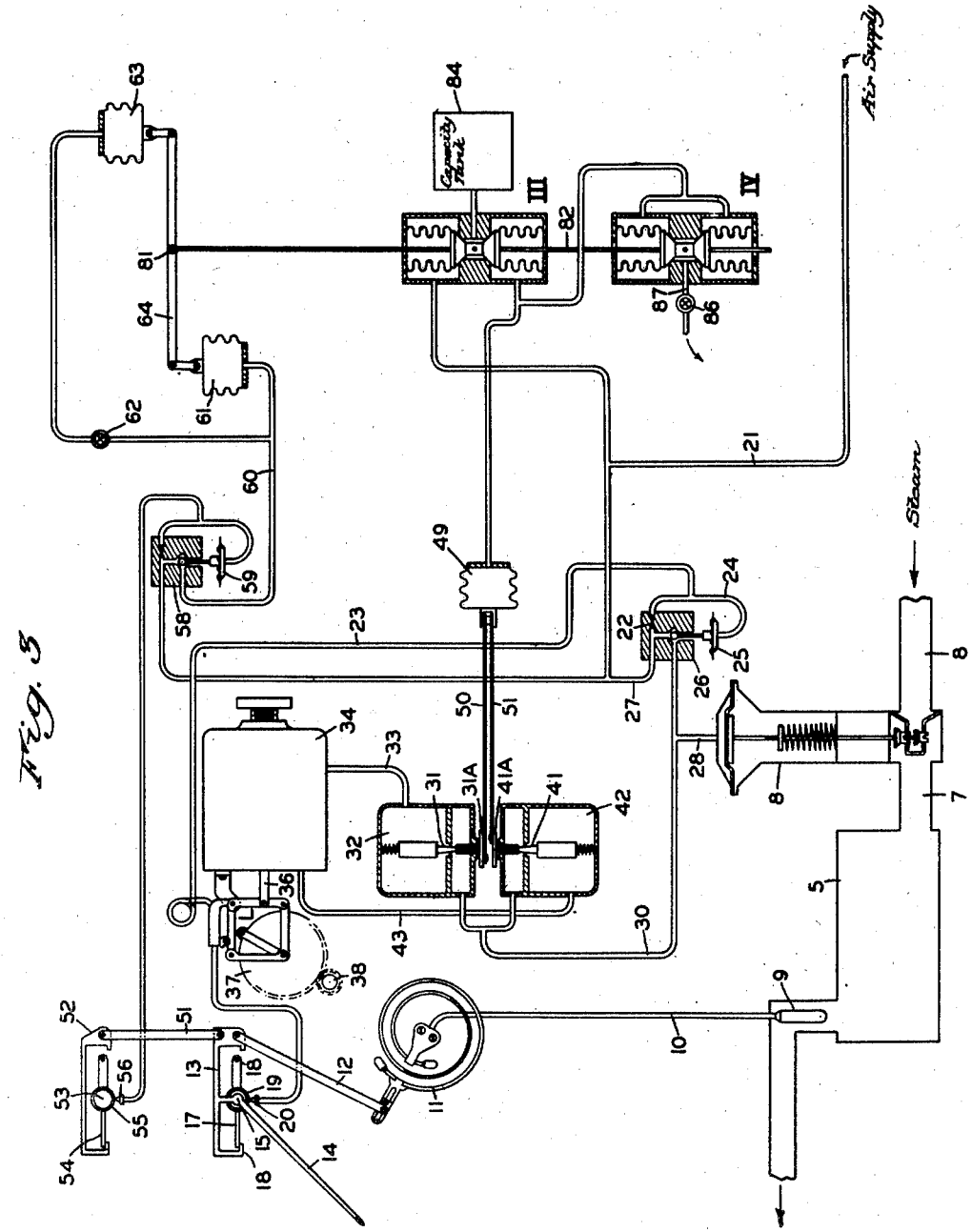

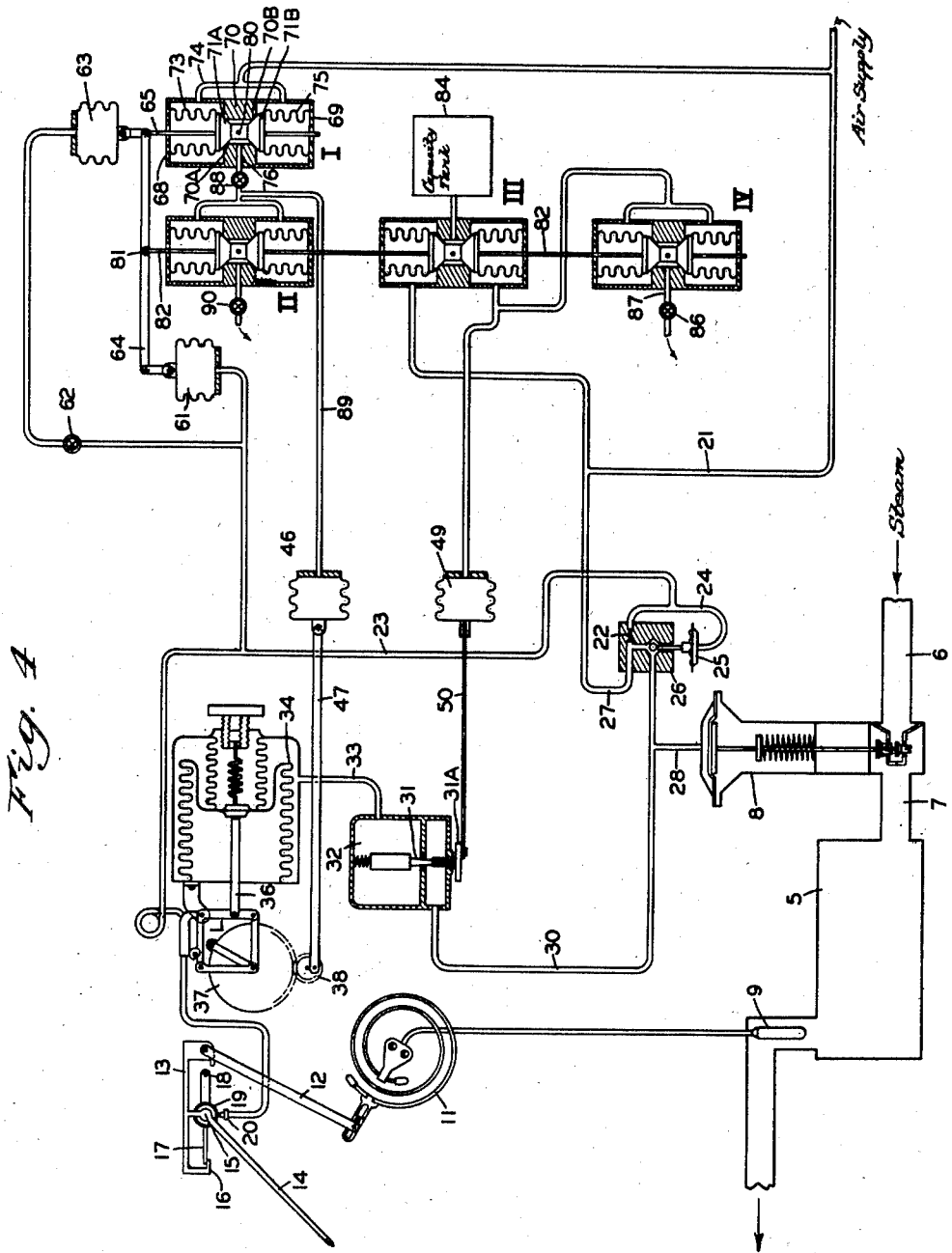

2,517,081

UNITED STATES PATENT OFFICE 2,517,081

CONTROL SYSTEM WITH AUTOMATIC RESPONSE ADJUSTMENT

William I. Caldwell, Rochester, N. Y., assignor to Taylor Instrument Companies, Rochester, N. Y., a corporation of New York Application April 25, 1947, Serial No. 743,862

15 Claims. (Cl. 236—82)

This invention relates to a control system for maintaining at substantially a given value, a variable condition encountered in process control such as, temperature, pressure liquid level, rate of flow and like variables.

Modern process controllers are often so complicated by the presence of so many adjusting knobs that none but the most skilled instrument men can adjust them for optimum performance. But even with such skilled men, the process of manually adjusting these controllers is frequently tedious and time consuming. Moreover, when the controller is manually adjusted for optimum control under one set of operating conditions, it may not function properly under other conditions but must be re-adjusted for the new set of conditions. An alternative procedure that is often resorted to, is to adopt a compromise adjustment which is reasonably satisfactory for all load conditions, but which rarely provides optimum control for any given load condition.

In accordance with one feature of the present invention there is provided, self-adjusting mechanism for continuously maintaining a controller in adjustment, thereby eliminating the need of frequent manual adjustments while affording optimum or near optimum adjustments at all times and under all load conditions that the controller is designed to control.

In accordance with another feature of the present invention there is provided a controller in which all of the adjustments thereof that are not automatically effected, are adjusted by a unicontrol mechanism.

In the patent to Tate et al. No. 2,361,885, granted October 31, 1944, to the assignee of the present invention, there is disclosed a control system as well as a controller, for use therein which may incorporate one or more units to provide the functions of sensitivity reduction (proportional response), preact and reset, either singly or in various combinations.

In the controller disclosed in the mentioned patent, there is provided a sensing device to detect deviations of the controlled process variable, from the desired value. The controller mechanism then varies the amount of correcting medium introduced into the process in such a way as to tend to correct the deviation. For example, the controller may be of the pneumatic type, that is utilized to control the temperature of a process by varying the air pressure to a diaphragm valve which, in turn, varies the flow of steam to the process. When a deviation from the control value occurs, the pressure on the diaphragm of the valve is usually varied in one or more of the following ways: (a) by a response wherein the pressure change is proportional to the deviation, herein referred to as proportional control (sensitivity reduction); (b) by a pressure change proportional to the time integral of the deviation from the control value, herein called reset; (c) by a pressure change proportional to the rate of change of the controlled variable, herein called pre-act. The measures of these three responses will be calibrated in units of sensitivity, of reset rate, and of pre-act time, respectively. These responses are so defined that an increase in any one of them will increase the pressure change on the diaphragm of the control valve. When the sensitivity setting of a controller is too high, the controlled variable will cycle continuously or hunt. If proportional control is used alone, too low a sensitivity setting will result in unnecessarily large deviations from the control value due to load changes, a condition often called "wander." Reset is used to correct wander but too high a reset rate tends to cause hunting. Generally, when reset is added to a controller, the sensitivity is set lower than it would be if proportional control were used alone. The use of pre-act often results in better control. For a further understanding of the invention reference is made to the detailed description and claims when taken with the drawings in which:

Fig. 1 is a diagrammatic showing of the control system of the present invention;

Fig. 1a illustrates a detail of the system of Fig. 1;

Figs. 2 and 2a as well as Figs. 3 and 4 illustrate other modified forms of the invention.

In Fig. 1, there is disclosed a control system including a pneumatic controller for effecting proportional, reset, and pre-act responses, said controller being provided with self-adjusting mechanism to automatically effect the best setting of each of these responses with respect to prevailing conditions. As will be shown, this mechanism sets the pre-act time directly proportional to the period of cycling and the reset rate inversely proportional to the period. No change in these settings will occur until and unless an oscillation of another period occurs. When hunting occurs the self-adjusting mechanism will reduce the sensitivity. If wander occurs the sensitivity will be automatically increased. As long as the controlled variable is held at the desired value, no change in the sensitivity setting will occur.

In the system, there is provided a process bath 5, to which steam is supplied through pipes 6 and 7 under the control of the diaphragm valve 8, to maintain the temperature of the bath at a given value.

Deviations from the required temperature within the bath are sensed by a tube system which comprises a bulb 9 communicating through a capillary tube 10 with a Bourdon spring 11, the tube system being filled with a thermosensitive medium. Let it be assumed that the temperature at the bulb increases, thereby causing the Bourdon spring 11 to unwind. This movement of the spring is communicated through a link 12 to a pen arm bracket 13 and pen arm 14 which are pivotally mounted at 15 so that when the Bourdon spring tends to unwind, the left end of the bracket tends to rise. The mentioned end of the bracket is provided with a hook 16 to engage the baffle lever 17 which is pivoted at 18. The intermediate part of the baffle lever carries a baffle 19 to cooperate with a movable nozzle 20, the baffle and nozzle constituting a control couple. Compressed air at uniform pressure is supplied from pipe 21 through restriction 22 and thence through pipe 23 to nozzle 20 where it escapes under the control of baffle 19. Thus when the temperature at the bulb 9 increases, the Bourdon spring will cause the baffle 19 to be separated slightly from the nozzle 20. This lowers the back pressure at the nozzle and in pipes 23 and 24 leading to the capsular chamber 25 of the relay valve 26. This chamber tends to collapse, tending to open valve 26. As relay valve 26 opens, compressed air is applied from pipes 21 and 27, through this valve and through pipe 28, to the diaphragm motor top of the valve 8 which closes to reduce the amount of steam supplied to the bath 5 through pipe 7. The compressed air in pipe 28 is also applied through branch pipe 30 as well as through the adjustable needle valve 31, capacity 32 and pipe 33, to the interior of bellows 34. Bellows 34 tends to expand and by means of push rod 36 and the adjustable parallelogram linkage generally designated L, moves the nozzle 20 upward. The construction of the parallelogram linkage and its method of operation are more fully disclosed in the mentioned Tate et al. patent.

As more fully disclosed in the mentioned patent, a gear such as 37 is operated by pinion 38 to change the effectiveness of the parallelogram linkage L so that a given movement of push rod 36 may effect a relatively large or a relatively small movement of the nozzle 20. In other words, the linkage L provides a sensitivity adjustment. The upward movement of the nozzle with the consequent reduction in the separation of the baffle and nozzle provides a so-called follow-up action or sensitivity reduction so that the operation of the controller and the adjustment of the motor diaphragm valve 8 will be proportional to the deviation in temperature at the bulb 9.

The proportional action just referred to neglects the action of the needle valve 31 and the capacity 32. However, these two elements cooperate to superimpose on the proportional response of the controller, a control action known as pre-act, which is proportional to the rate of the deviation in temperature. The rotation of the knob 31A of the needle valve 31 changes the pre-act time.

The present controller is also provided with a so-called reset action. This action is effected by a bellows 39 which is mounted to oppose the action of the first-mentioned bellows 34 so that the follow-up action which is effected by the operation of the first bellows is cancelled out, after a predetermined interval of time known as the reset time. In effecting this reset operation the compressed air supplied through pipe 28 to the top of the motor diaphragm valve 8, is applied through pipe 30, needle valve 41 and capacity 42, pipe 43, to the interior of bellows 39 until the pressures in bellows 39 equals that in bellows 34. The rotation of the knob 41A of the needle valve 41 changes the reset rate. The structure of the mechanism thus far referred to may be identical with that disclosed in the above mentioned patent.

The automatic adjustment of the sensitivity reduction of the controller is effected by the expansion and contraction of the pneumatically operated bellows 46 in a manner to be set forth. This bellows has its right end mounted on a fixed support while its left end is connected by a link 47 to an eccentrically located point on the pinion 38. Thus as the link 47 is moved lengthwise to the right or to the left, by bellows 46, the pinion will be rotated counterclockwise or clockwise respectively, to change the setting of the controller.

The automatic adjustment of the pre-act time is similarly effected by a pneumatically operated bellows 49 which has its right end fixed to a support. The movable left end of this bellows is connected by a link 50 to an eccentrically located point on the knob 31A of the needle valve 31. By this construction when the bellows 49 expands or contracts by the application thereto of varying pressures as will be set forth, the link 50 will move lengthwise to the right or to the left respectively. These movements of the link rotate the knob 31A clockwise or counterclockwise, to change the setting of the needle valve 31 and thereby change the pre-act time.

Also the free end of the bellows 49 is also connected by a link 51 to an eccentric point on the knob 41A of the needle valve 41. Consequently the bellows 49 in expanding or contracting respectively, adjusts the needle valve 41 to change the reset rate.

In order to sense the need for automatically changing the setting of the controller to maintain optimum adjustments thereof, there is preferably provided a second control couple comprising the baffle 55 with the cooperating nozzle 56 and the relay valve 58, which is operated in the same manner as the baffle 19, nozzle 20 and relay valve 26. The previously mentioned bracket 13 which is operated by the tube system on any change in temperature at the bulb 9, operates through link 51 to cause a similar motion of the bracket 52. The bracket 52 is pivoted at 53 and is provided with a hook to raise and lower the left end of the baffle lever 54 and the baffle 55 carried thereby. In response to the changes in the space relation between the baffle 55 and nozzle 56, the back pressure at the nozzle and in the capsular chamber 59 of valve 58 is varied accordingly. The movable part of the valve 58 in like manner, changes the output pressure in the pipe 60 leading from the relay to the bellows 61 and through adjustable restriction 62 to the bellows 63. The lower end of bellows 61 is fixed while its movable upper end is pivotally connected to the left end of the differential lever 64. However, the upper end of the bellows 63 is fixed and its lower movable end is connected to the right end of differential lever 64. The right end of the differential lever 64 is also connected to the valve stem 65 which is a part of a leakless valve I. This valve comprises a cylindrical body having its ends 68 and 69 perforated to permit the valve stem 65 to pass freely therethrough. The body has a centrally perforated partition 70 provided with the valve seats 70A and 70B. An upper valve disc 71A which cooperates with valve seat 70A, encircles the valve stem 65 to move freely in airtight relation thereon. This valve disc is carried by a bellows 73 which has its lower end sealed to the periphery of the valve disc and which has its upper end sealed to the margin of the upper end 68 of body around the perforation therein. The bellows 73 surrounds the valve stem 65 and with the upper half of the valve body, forms a chamber to which compressed air is supplied through pipe 74 and from which chamber the compressed air escapes to pipe 76 under the control of the valve disc 71A. The valve disc 71B which cooperates with valve seat 70B, is likewise carried in sealed relation on the upper end of bellows 75. The lower end of this bellows is sealed to the end 69 of the body around the opening therein. The lower half of the body together with bellows 75 provides a chamber to which compressed air is supplied through pipe 74 and from which chamber air escapes to pipe 76 under the control of valve disc 71B. The valve disc 71A normally engages its valve seat 70A and the valve disc 71B normally engages its valve seat 70B. A collar 80 fixed to the valve stem 65 when moved upward unseats valve disc 71A and when moved downward unseats the valve disc 71B.

An intermediate point 81 on the differential lever 64 has pivotally connected thereto a valve stem 82 which is common to the leakless valves II, III, and IV. These leakless valves are identical in construction with valve I and need not be further described.

Due to the restriction 62 in pipe 59 and due to the capacity of the bellows 63, beyond it, a filter action is obtained so that bellows 63 and valve I driven by it, is unaffected by cyclic variations in the controlled pressure but does respond to wander, that is, non-cyclic deviation from the control point. If it is desirable, better or more complete filtering can be obtained by the addition of more resistances and capacities in the well known manner.

At point 81 on the differential lever 64 which connects bellows 60 and 63, as previously mentioned, wander of the controlled variable produces no displacement. However, a cyclic displacement of point 81 on lever 64 with the resultant cyclic displacement of valves II, III and IV, occurs in response to cycling of the controlled variable. Consequently, when the wander condition arises, the pressure will increase in bellows 46 since compressed air will be supplied either through the upper or lower chamber of valve I, pipe 76, adjustable restriction 88 and pipe 89, but when the cycling condition arises, the pressure in bellows 46, will decrease since the compressed air will tend to escape through pipe 89 and through either the upper or the lower chamber of valve II, adjustable restriction 90, to the atmosphere. Bellows 46, as previously mentioned, is connected to the pinion 38 which adjusts the sensitivity of the controller so that on cycling the sensitivity of the controller will be reduced and on wander the sensitivity will be increased. In this way the self-adjusting mechanism can set the sensitivity to that required by the process and can change it as required by changes in the process. The width of the band in which no readjust takes places depends upon the width of the collar such as 80 on the valve stem such as 65 and on the displacement of the bellows such as 61 and 63 respectively in response to a given deviation of the controlled variable from the control point. Relay valve 58 in the self-adjusting mechanism is not necessary but would probably be used in an economical design.

It should be noted that the pressure in bellows 46 is generally insensitive to the period of cycling as long as the amplitude of the strokes of the stem 82 of valve II is large as compared to the length of the stroke during which both valve seats are seated.

The pressure in bellows 49 is a function of the period of cycling. On displacement of the stem 82 of valve III, in one sense, compressed air is admitted to the capacity tank 84. On displacement of the stem in the opposite sense compressed air is supplied from the tank 84 to bellows 49, thereby increasing the pressure in it. During sustained oscillations, valve IV will be open a percentage of the time depending on its adjustment but not on the period. Consequently, leakage from bellow 49 through valve IV and adjustable restriction 86 in pipe 87 to the atmosphere, will be independent of the period of the cycle. The inflow into bellows 49 through valve III will be inversely proportional to the period so that as the period gets shorter the pressure in bellows 49 will increase. As previously mentioned, the free end of bellows 49 is connected by the links 51 and 50 to the mechanism controlling the reset rate and the pre-act time in such a way that as the period increases the reset rate decreases and the pre-act time increases.

In the modified form of the invention disclosed in Fig. 2, the automatic adjustment of the sensitivity of the controller, as shown in Fig. 1, is retained. However, the automatic mechanism for adjusting the pre-act time and the reset rate as illustrated in Fig. 1, has been omitted. The omitted portions include the links 50 and 51, bellows 49, leakless valves III and IV and capacity tank 84. In this modification, the knob 31A of needle valve 31 and the knob 41A of the needle valve 41, are placed end to end in close relation, with a pad 91 of resilient material such as rubber therebetween. The disc 91 frictionally engages the exposed ends of the knobs 31A and 41A, thereby effectively providing a manual unicontrol for the needle valve 31 which changes the pre-act time and for the needle valve 41 which changes the reset rate. The frictional engagement of the disc 91 with the knobs 31A and 41A, also permits these knobs to be independently adjusted in the event that it is desired to establish a different relation between the pre-act and reset adjustments although this is rarely necessary.

The form of the invention illustrated in Fig. 3, differs from that shown in Fig. 1 in that the sensitivity is adjusted by manually rotating the pinion 38. The means for automatically effecting this adjustment are omitted. The omitted parts include the link 47, bellows 46, pipe 89, and leakless valves I and II. The construction and operation of the mechanism for automatically adjusting the pre-act time and reset rate have already been described in connection with Fig. 1 and need not be repeated.

In the modification disclosed in Fig. 4, the automatic adjustment of sensitivity and automatic adjustment of pre-act time, as shown in Fig. 1, are retained, but the reset control effect, is completely omitted. In this arrangement, the bellows 39, pipe 43, capacity 42, needle valve 31 and link 51 are omitted. In this modification the supplemental baffle 55, nozzle 56 and relay valve 58 have been omitted for purposes of economy but with some decrease in efficiency of operation. As herein shown, the pipe 60 communicates with pipe 23 which in turn is connected directly to the nozzle 20. It should be noted that the stems on the knobs 31A and 41A are threaded in the left hand sense.

In this specification the term "wander" has been used as synonymous with "aperiodic deviation" from the control point, while the terms "hunting" and "oscillating" have been used as synonymous with "periodic deviation."

What I claim is:

1. In a system for correcting deviations in a certain variable from a given control value, mechanism for sensing deviations in said variable, primary means proportionally responsive to a given sensed deviation for applying an agent for correcting said deviation, secondary means for controlling the application of said correcting agent in amounts proportional to the time integral of the said sensed deviation from the control value, tertiary means for controlling the application of said correcting agent in amounts proportional to the rate of change of said sensed deviation, means responsive to a tendency for deviations from the given control value for automatically adjusting the amount of response of said primary means to any given deviation, and other means responsive to hunting or oscillation of the variable about the control value for automatically adjusting the amount of response of said secondary means and said tertiary means to any given deviation.

2. In a system for correcting deviations in a certain variable from a given control value, mechanism for sensing deviations in said variable, primary means proportionally responsive to a given sensed deviation for applying an agent for correcting said deviation, secondary means for controlling the application of said correcting agent in amounts proportional to the time integral of the said sensed deviation from the control value, tertiary means for controlling the application of said correcting agent in amounts proportional to the rate of change of said sensed deviation, means actuated by an aperiodic deviation for increasing the response of the primary means to a given deviation and actuated by a periodic deviation for decreasing the response of the primary means to said given deviation, and other means responsive to hunting or oscillation of the variable about the control value for automatically adjusting the amount of response of said secondary means and said tertiary means to any given deviation.

3. In a system for correcting deviations in a certain variable from a given control value, mechanism for sensing deviations in said variable, primary means proportionally responsive to a given sensed deviation for applying an agent for correcting said deviation, secondary means for controlling the application of said correcting agent in amounts proportional to the time integral of the said sensed deviation from the control value, tertiary means for controlling the application of said correcting agent in amounts proportional to the rate of change of said sensed deviation, means responsive to a tendency for deviations from the given control value for automatically adjusting the amount of response of said primary means, to any given deviation, and other means directly proportional to the period of the oscillations of the variable about the control value and inversely proportional to the period of said oscillations for automatically adjusting the amount of response of said tertiary means and said secondary means respectively.

4. In a system for correcting deviations in a certain variable from a given control value, mechanism for sensing deviations in said variable, primary means proportionally responsive to a given sensed deviation for applying an agent for correcting said deviation, secondary means for controlling the application of said correcting agent in amounts proportional to the time integral of the said sensed deviation from the control value, tertiary means for controlling the application of said correcting agent in amounts proportional to the rate of change of said sensed deviation, means actuated by an aperiodic deviation for increasing the response of the primary means to a given deviation and actuated by a periodic deviation for decreasing the response of the primary means to said given deviation, and other means responsive to a periodic deviation of the variable about the control value for automatically adjusting the amount of response of said tertiary means to any given deviation.

5. In a system for correcting deviations in a certain variable from a given control value, mechanism for sensing deviations in said variable, primary means proportionally responsive to a given sensed deviation for applying an agent for correcting said deviation, secondary means for controlling the application of said correcting agent in amounts proportional to the time integral of the said sensed deviation from the control value, tertiary means for controlling the application of said correcting agent in amounts proportional to the rate of change of said sensed deviation, means actuated by an aperiodic deviation for increasing the response of the primary means to a given deviation and actuated by a periodic deviation for decreasing the response of the primary means to said given deviation, and other means responsive to a periodic deviation of the variable about the control value for automatically adjusting the amount of response of said secondary means to any given deviation.

6. In a system for correcting deviations in a certain variable from a given control value, mechanism for sensing deviations in said variable, primary means proportionally responsive to a given sensed deviation for applying an agent for correcting said deviation, secondary means for controlling the application of said correcting agent in amounts proportional to the time integral of the said sensed deviation from the control value, tertiary means for controlling the application of said correcting agent in amounts proportional to the rate of change of said sensed deviation, and means actuated by an aperiodic deviation for increasing the response of the primary means to a given deviation and actuated by a periodic deviation for decreasing the response of the primary means to said given deviation.

7. In a system for correcting deviations in a certain variable from a given control value, mechanism for sensing deviations in said variable, primary means proportionally responsive to a given sensed deviation for applying an agent for correcting said deviation, secondary means for controlling the application of said correcting agent in amounts proportional to the time integral of the said sensed deviation from the control value, tertiary means for controlling the application of said correcting agent in amounts proportional to the rate of change of said sensed deviation, manually operated means for adjusting the amount of response of said primary means, to any given deviation, and other means directly proportional to the period of the oscillations of the variable about the control value and inversely proportional to the period of said oscillations for automatically adjusting the amount of response of said tertiary means and said secondary means respectively.

8. In a system for correcting deviations in a certain variable from a given control value, mechanism for sensing deviations in said variable, primary means proportionally responsive to a given sensed deviation for applying an agent for correcting said deviation, secondary means for controlling the application of said correcting agent in amounts proportional to the time integral of the said sensed deviation from the control value, tertiary means for controlling the application of said correcting agent in amounts proportional to the rate of change of said sensed deviation, manually operated means for adjusting the amount of response of said primary means to any given deviation, and other means responsive inversely proportional to the period of said oscillations for automatically adjusting the amount of response of said secondary means.

9. In a system for correcting deviations in a certain variable from a given control value, mechanism for sensing deviations in said variable, primary means proportionally responsive to a given sensed deviation for applying an agent for correcting said deviation, secondary means for controlling the application of said correcting agent in amounts proportional to the time integral of the said sensed deviation from the control value, tertiary means for controlling the application of said correcting agent in amounts proportional to the rate of change of said sensed deviation, manually operated means for adjusting the amount of response of said primary means to any given deviation, and other means responsive directly proportional to the period of the oscillations of the variable about the control value for automatically adjusting the amount of response of said tertiary means.

10. In a system for correcting deviations in a certain variable from a given control value, mechanism for sensing deviations in said variable, primary means proportionally responsive to a given sensed deviation for applying an agent for correcting said deviation, secondary means for controlling the application of said correcting agent in amounts proportional to the time integral of the said sensed deviation from the control value, tertiary means for controlling the application of said correcting agent in amounts proportional to the rate of change of said sensed deviation, means responsive to deviations from the given control value for automatically adjusting the amount of response of said primary means to any given deviation and a manually operated element for adjusting the amount of response of said secondary means and said tertiary means to any given deviation.

11. In a system for correcting deviations in a certain variable from a given control value, mechanism for sensing deviations in said variable, primary means proportionally responsive to a given sensed deviation for applying an agent for correcting said deviation, secondary means for controlling the application of said correcting agent in amounts proportional to the time integral of the said sensed deviation from the control value, tertiary means for controlling the application of said correcting agent in amounts proportional to the rate of change of said sensed deviation, means responsive to deviations from the given control value for automatically adjusting the amount of response of said primary means to any given deviation, and a manually operated unicontrol element for adjustably increasing the response of said secondary means and for simultaneously decreasing the response of said tertiary means to any given deviation and vice versa.

12. In a system for correcting deviations in a certain variable from a given control value, mechanism for sensing deviations in said variable, primary means proportionally responsive to a given sensed deviation for applying an agent for correcting said deviation, other means for controlling the application of said correcting agent in amounts proportional to the rate of change of said sensed deviation, means responsive to deviations from the given control value for automatically adjusting the amount of response of said primary means to any given deviation, and other means responsive to hunting of the variable about the control value for automatically adjusting the amount of response of said other means to any given deviation.

13. In a system for correcting deviations in a certain variable from a given control value, mechanism for sensing deviations in said variable, primary means proportionally responsive to a given sensed deviation for applying an agent for correcting said deviation, secondary means for controlling the application of said correcting agent in amounts proportional to the time integral of the said sensed deviation from the control value, means actuated by an aperiodic deviation for increasing the response of the primary means to a given deviation and actuated by a periodic deviation for decreasing the response of the primary means to said given deviation, and other means responsive to hunting or oscillation of the variable about the control value for automatically adjusting the amount of response of said secondary means to any given deviation.

14. In a system for correcting deviations in a certain variable from a given control value, mechanism for sensing deviations in said variable, primary means proportionally responsive to a given sensed deviation for applying an agent for correcting said deviation, means actuated by an aperiodic deviation for increasing the response of the primary means to a given deviation and actuated by a periodic deviation for decreasing the response of the primary means to said given deviation.

15. In a system for correcting deviations in a certain variable from a given control value, mechanism for sensing deviations in said variable, primary pneumatic means proportionally responsive to a given sensed deviation for applying an agent for correcting said deviation, and pneumatic means actuated by an aperiodic deviation for increasing the response of the primary means to a given deviation and actuated by a periodic deviation for decreasing the response of the primary means to said given deviation.

WILLIAM I. CALDWELL.

REFERENCES CITED

The following references are of record in the file of this patent:

UNITED STATES PATENTS

| Number | Name | Date |
|---|---|---|
| 2,073,838 | Hammond et al. | Mar. 16, 1937 |
| 2,119,061 | Stein et al. | May 31, 1938 |
| 2,175,351 | Hammond | Oct. 10, 1939 |
| 2,176,603 | Belaef | Oct. 17, 1939 |
| 2,361,885 | Tate et al. | Oct. 31, 1944 |